United States Patent
Casey et al.

[19]

[11] Patent Number: 5,810,541
[45] Date of Patent: Sep. 22, 1998

[54] APPARATUS AND METHOD FOR MANUALLY EXCHANGING PALLETS

[75] Inventors: Steven E. Casey; Michael D. Desfosses, both of Nashua, N.H.

[73] Assignee: International Paper Box Machine Co., Inc., Nashua, N.H.

[21] Appl. No.: 651,911

[22] Filed: May 21, 1996

[51] Int. Cl.$^6$ .................................................. B23Q 7/00
[52] U.S. Cl. ........................ 414/401; 414/786; 414/222; 414/286; 29/791; 198/346.1; 105/141; 186/58
[58] Field of Search ...................... 105/141, 144, 105/DIG. 118, 150; 414/786, 222, 589, 266, 267, 268, 277, 280, 281, 282, 286, 352, 345, 343, 340, 390, 392, 396, 400, 401, 402, 584, 509; 198/346.1; 483/14, 15; 29/791; 104/105, 48, 93; 425/62, DIG. 117; 186/46, 58, 27, 34

[56] References Cited

U.S. PATENT DOCUMENTS

| | | | |
|---|---|---|---|
| 3,881,427 | 5/1975 | Blume | 105/141 |
| 4,373,840 | 2/1983 | Miller, Jr. | 414/225 |
| 4,480,738 | 11/1984 | Mattson | 198/339 |
| 4,626,160 | 12/1986 | Shiomi et al. | 414/222 |
| 4,747,193 | 5/1988 | Hashidate et al. | 198/346.1 X |
| 4,781,512 | 11/1988 | Ohta et al. | 414/222 |
| 4,797,989 | 1/1989 | Cherko | 29/568 |
| 4,890,371 | 1/1990 | Camloh et al. | 29/33 P |
| 4,995,502 | 2/1991 | Kitamura | 198/346.1 |
| 4,996,754 | 3/1991 | Kitamura | 29/33 P |
| 5,018,617 | 5/1991 | Miyata et al. | 198/346.1 |
| 5,062,190 | 11/1991 | Kitamura | 29/33 P |
| 5,156,254 | 10/1992 | Kitamura et al. | 198/346.1 |
| 5,187,846 | 2/1993 | Kitamura et al. | 29/33 P |
| 5,301,788 | 4/1994 | Hironaka et al. | 198/346.1 |
| 5,387,063 | 2/1995 | Napierkowski et al. | 414/401 X |

FOREIGN PATENT DOCUMENTS

| | | | |
|---|---|---|---|
| 2947547 | 6/1981 | Germany | 186/58 |
| 245348 | 10/1988 | Japan | 414/222 |

*Primary Examiner*—Frank E. Werner
*Attorney, Agent, or Firm*—Pearson & Pearson

[57] ABSTRACT

A manual pallet exchange system for exchanging a pallet on a work table of a horizontal machining center with another pallet from a storage rack or an optional set-up station. The system comprises a pallet shuttle cart which travels along a guideway that is positioned adjacent to the storage rack, the set-up station and the horizontal machining center. Receiving devices are provided on the horizontal machining center, the shuttle cart, the set-up station and each pallet storage location on the storage rack for receiving and supporting the pallet. A mechanically activated locking device provides for safely securing the pallet to the receiving devices of the storage rack, the set-up station and the shuttle cart.

14 Claims, 4 Drawing Sheets

APPARATUS AND METHOD FOR MANUALLY EXCHANGING PALLETS

BACKGROUND OF THE INVENTION

1. Field of the Invention

This invention relates generally to a system for changing pallets on a horizontal machining center and in particular to a manual pallet exchange apparatus having a pallet shuttle cart which travels along a linear guideway for moving pallets safely.

2. Description of Related Art

The high cost of machine tools and the expense of a labor force requires that they be used as efficiently as possible by keeping the machine tools running all the time. During the operation of a machining center, it is desirable to have the next job ready and the operator monitoring operation of the machining center and the pallet with a workpiece being operated on. Further, it is efficient to have the same operator setting up the next workpiece on a pallet while observing information panels. To accomplish this, a work station has to be conveniently positioned where the operator can work setting up a new workpiece and observe the workpiece being operated on by the machine tool.

Pallets are generally very heavy and systems in the prior art are often automated requiring electrical, hydraulic or pneumatic power, resulting in expensive pallet handling systems. A manual, low cost, pallet exchange apparatus has not been available in the prior art for a horizontal machining center.

In U.S. Pat. No. 4,373,840, issued Feb. 15, 1983 to Leonard A. Miller, Jr. a pallet transfer system is disclosed that comprises a cart upon which a pallet can be deposited for movement on a track rails to other parts of the factory or to other machining centers. It includes a foundation and a base rotatable upon the foundation. A ram is translatably slidable on the rotatable base. A latch is reciprocable upon the ram. A workpiece is rigidly secured to the pallet by pallet-carried chuck mechanisms. The two-rail pallet transfer system provides for setting up a second workpiece while a first workpiece is being operated on by the machine tool, but it may not enable an operator, while setting up the second workpiece, to see the control panels or two operators are required. Further, it requires rails to be installed on a plant floor which provides a hazard to employees walking near such rails.

In U.S. Pat. No. 4,781,512, issued Nov. 1, 1988 to Takeshi Ohta et al, a pallet changing system is disclosed for a machine tool including a pallet changing device which is horizontally rotatable for exchanging a pallet on the work table of the machine tool with another pallet in a standby station. A plurality of pallet storing shelves are arranged in a plurality of concentric circular arrays and each shelf has a plurality of pallet supporting racks located one above another. The standby station forms a part of those circular arrays defining a central space surrounded by the racks. A rotary table is rotatably disposed in the center of that space and a pallet loading and unloading device is provided. This pallet changing system represents an expensive automatic system for providing a plurality of pallets with workpieces set-up and ready to be worked on by the machine tool.

SUMMARY OF THE INVENTION

Accordingly, it is therefore an object of the invention to provide a manual pallet exchange system for easily and safely exchanging a pallet on a work table of a machining center with another pallet from a storage rack or a set-up station.

It is another object of the invention to provide a low cost pallet exchange system for a horizontal machining center.

It is a further object of the invention to provide a system which does not require major modification to a horizontal machining center.

It is another object of the invention to provide a pallet shuttle cart for moving pallets among a pallet storage rack, a pallet set-up station and a machining center.

It is another object of the invention to prevent any movement of a pallet when positioned on receiving means by utilizing a mechanically activated locking pin.

It is another object of the invention to prevent any movement of a pallet when positioned on a shuttle cart receiving plate by providing a pallet lock and a pallet hitch receiver.

It is another object of the invention to provide a linear guideway for one side of the pallet shuttle cart to move along in a secure manner.

The objects are further accomplished by a pallet exchange apparatus for a horizontal machining center comprising a pallet storage rack, guideway means attached to support structures adjacent to the horizontal machining center and the pallet storage rack for providing a linear rail, and cart means attached to the guideway means for moving a pallet between the horizontal machining center and the pallet storage rack along the guideway means. The pallet storage rack comprises a plurality of pallet receiving means for supporting and transferring the pallet. Each of the pallet storage rack, the horizontal machining center and the cart means comprises pallet receiving means for supporting and transferring the pallet. Each of the receiving means of the pallet storage rack comprises a locking pin means for securing the pallet on the receiving means. The locking pin means is deactivated by the insertion of a shuttle cart push rod into a locator spring block assembly of the receiving means. The cart means comprises a leg having a wheel for supporting one side of the cart means opposite the side attached to the guideway means.

The objects are further accomplished by a pallet exchange apparatus for a horizontal machining center comprising a pallet storage rack, a pallet set-up station, guideway means attached to support structures adjacent to the horizontal machining center, the pallet storage rack and the pallet set-up station for providing a linear rail, and cart means attached to the guideway means for moving a pallet among the machining center, the pallet storage rack and the pallet set-up station along the guideway means. The pallet storage rack comprises a plurality of pallet receiving means for supporting and transferring the pallets. Each of the pallet set-up station, the pallet storage rack, the horizontal machining center and the cart means comprises pallet receiving means for supporting and transferring the pallet. The receiving means of the pallet storage rack and the set-up station comprises a locking pin means for securing the pallet on the receiving means. The locking pin means is deactivated by the insertion of a shuttle cart push rod into a locator spring block assembly. The cart means comprises a leg having a wheel for supporting one side of the cart means opposite the side attached to the guideway means.

The objects are further accomplished by a method of exchanging pallets for a horizontal machining center comprising the steps of providing a pallet storage rack, positioning support structures adjacent to the pallet storage rack and the horizontal machining center, attaching a linear rail to the support structures to form a linear guideway, and providing a pallet shuttle cart attached to the linear guideway for moving pallets between the horizontal machining center and the pallet storage rack. The step of providing a pallet storage rack further comprises the step of providing a plurality of pallet receiving means on the storage rack for supporting and transferring the pallets. The method further comprises the step of providing receiving means for supporting and transferring the pallets on the pallet storage rack, the horizontal machining center and the pallet shuttle cart. The method further comprises the step of providing a locking pin means in the receiving means of the storage rack for securing the pallet on the receiving means. The method further comprises the step of deactivating the locking pin means by inserting a shuttle cart push rod into a locator spring block assembly.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
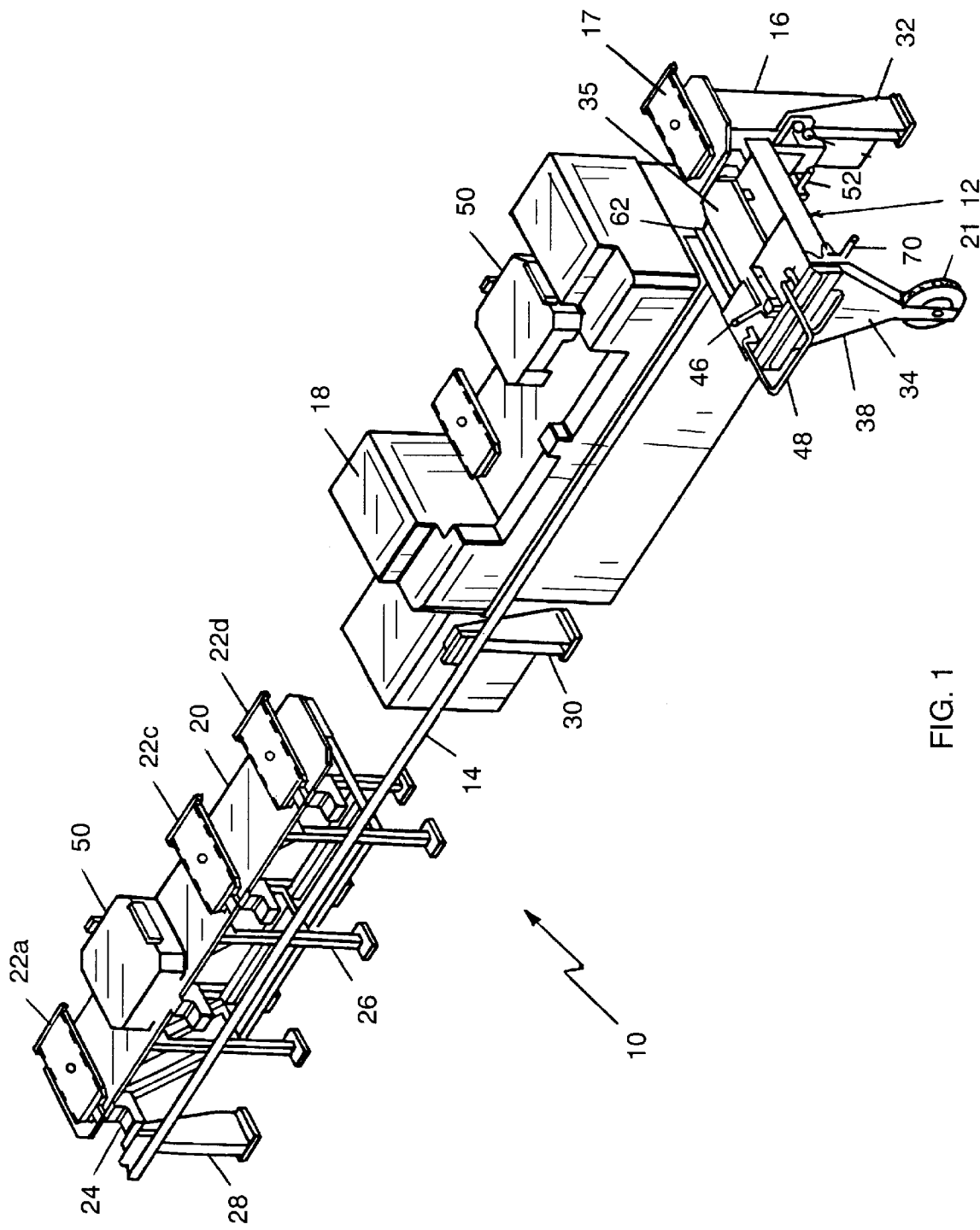
FIG. 1 is a perspective view of the invention of a manual pallet exchange system comprising a pallet storage rack, an optional pallet set-up station, a horizontal machining center which are positioned adjacent to a linear guideway having a pallet shuttle cart moving pallets safely along the guideway.

Referring to FIG. 1, there is shown an embodiment of a novel, manual, pallet exchange system 10 for operation with a machining center 18. This system is used to move pallets 50 to and from machining center 18 which in the present embodiment is a horizontal type.

The pallet exchange system 10 comprises a pallet storage rack 20 with a plurality of receiving plates 22a, 22b, 22c, 22d attached thereto as shown in the present embodiment and with a pallet 50 positioned on receiving plate 22b (which is not visible in FIG. 1), a machining center and a pallet shuttle cart 38. Although four receiving plates are shown in the present embodiment of the storage rack 20, the number of receiving plates is determined by the needs of a specific application. Each receiving plates 22a to 22d comprises a plurality of rollers (which amounts to 8 in the present embodiment) distributed around the edges of the receiving plate to facilitate moving the pallet 50 on and off such device. A pallet set-up station 16 is optional. A guideway 14 is attached to supports 28, 30, 32 which are positioned in a straight line adjacent to the optional pallet set-up station 16, horizontal machining center 18 and the pallet storage rack 20 respectively. The number of supports 28, 30, 32 depends on a particular application depending on the weight of the pallet 50 and the length of the guideway 14. The pallet shuttle cart 38 comprises support legs 34 attached to a wheel 36 on one side and having the other side attached to the linear guideway 14. Hence, the pallet shuttle cart 38 moves in a linear path along the guideway 14 from the pallet storage rack 20 to the machining center 18 or on to the pallet set-up station 16 when included in the system 10.

The pallet exchange system 10 requires no electrical, hydraulic or pneumatic power. It provides a low cost means of changing pallets for a horizontal machining center 18 and it is intended to make exchanging heavy pallets quick and simple. The machining center 18 can be of the type offered by Mazak Corporation of Florence, Ky., known as ULTRA 550. The pallet exchange system 10 is designed to be modular and to have a variety of embodiments depending on a desired floor plan and the number of pallets 50 to be stored. The pallet exchange system 10 allows for full operator access to the front of the machine center 18 for workpiece or pallet loading and unloading. The pallet set-up station 16 near the machining center 18 provides easy pallet access for its operator while monitoring machining center 18 operation. The set-up station 16 as noted above is considered an option and not required for the pallet system 10 operation. Safety features include a positive pallet locking mechanism on the storage rack 20, shuttle cart 38 and the set-up station 16 via a locator spring block assembly 45 shown in FIG. 2. The positive locking mechanism secures the pallet shuttle cart 38 in position during a pallet 50 transfer to and from the machining center, storage table 20 and set-up station 16.

Figure 2:
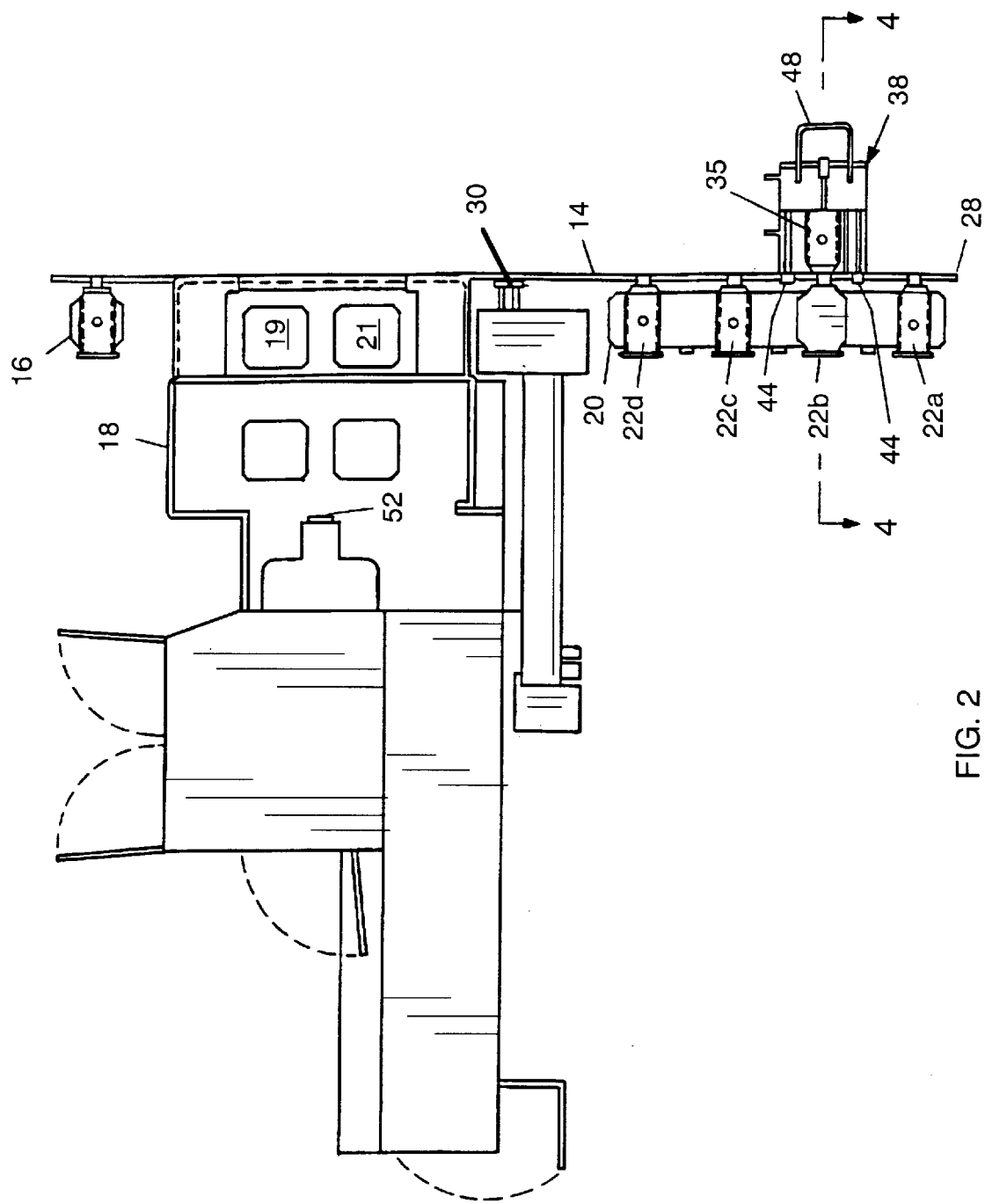
FIG. 2 is a top view of the manual pallet exchange system showing the linear guideway positioned adjacent to the horizontal machining center.

Referring now to FIG. 2, a top view of the manual pallet exchange system 10 is shown. The linear guideway 14 is shown positioned in front of and adjacent to the optional pallet set-up station 16, the machining center 18 and the pallet storage rack 20 which comprises the four receiving plates 22a–22d in the present embodiment. The guideway 14 may be embodied by a 2-inch hardened steel shaft manufactured by Thomson Industries, Inc., of Port Washington, N.Y. Bearing blocks 44 couple the pallet shuttle cart 38 to the guideway 14, and allows the shuttle 38 to glide along the guideway 14. The bearing blocks 44 may be embodied by Part No. SPB-32-OPN manufactured also by Thomson Industries, Inc., of Port Washington, N.Y. The pallet shuttle cart 38 is shown in front of the pallet storage rack 20 which clears the area in front of the machining center 18 allowing for direct access to the receiving plates 19 and 21 of the machining center 18.

Figure 3:
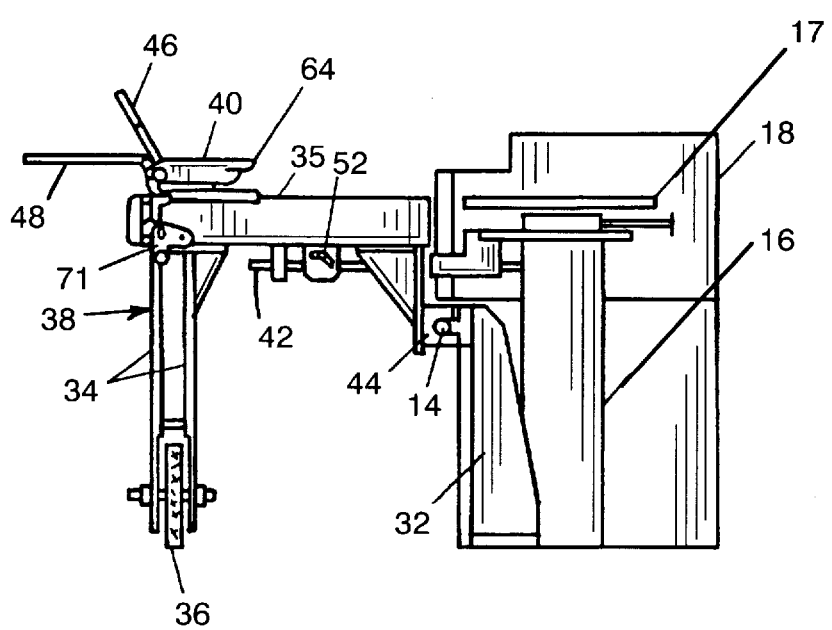
FIG. 3 is a right side view of the manual pallet exchange system showing the pallet shuttle cart connected to the pallet set-up station and attached to the guideway which is mounted to a support column.

Referring now to FIG. 3, a right side view of the pallet shuttle cart 38 connected to the pallet set-up station 16 is shown. The shuttle cart 38 is supported on one side by legs 34 having wheel 36 attached at the lower end and on the opposite side a bracket with bearing blocks 44 attached provides the means for attaching the shuttle cart 38 to the guideway 14. An adapter plate handle 48 is provided for moving adapter plate 40 and for moving the pallet shuttle cart 38. A hitch release handle 46 is provided for unhitching the hitch receiver 64 from hitch 66 (shown in FIG. 4) after moving a pallet 50 off the receiving plate 35 and to another receiving plate such as the receiving plate 17 on the pallet set-up station 16. The pallet set-up station 16 is designed to rotate the pallet 50 a full 360 degrees in 45 degree increments. This enables the operator of the machining center 18 to access all sides of the pallet 50 for set-up activity while facing the machining center 18 and monitoring its operation.

Figure 4:
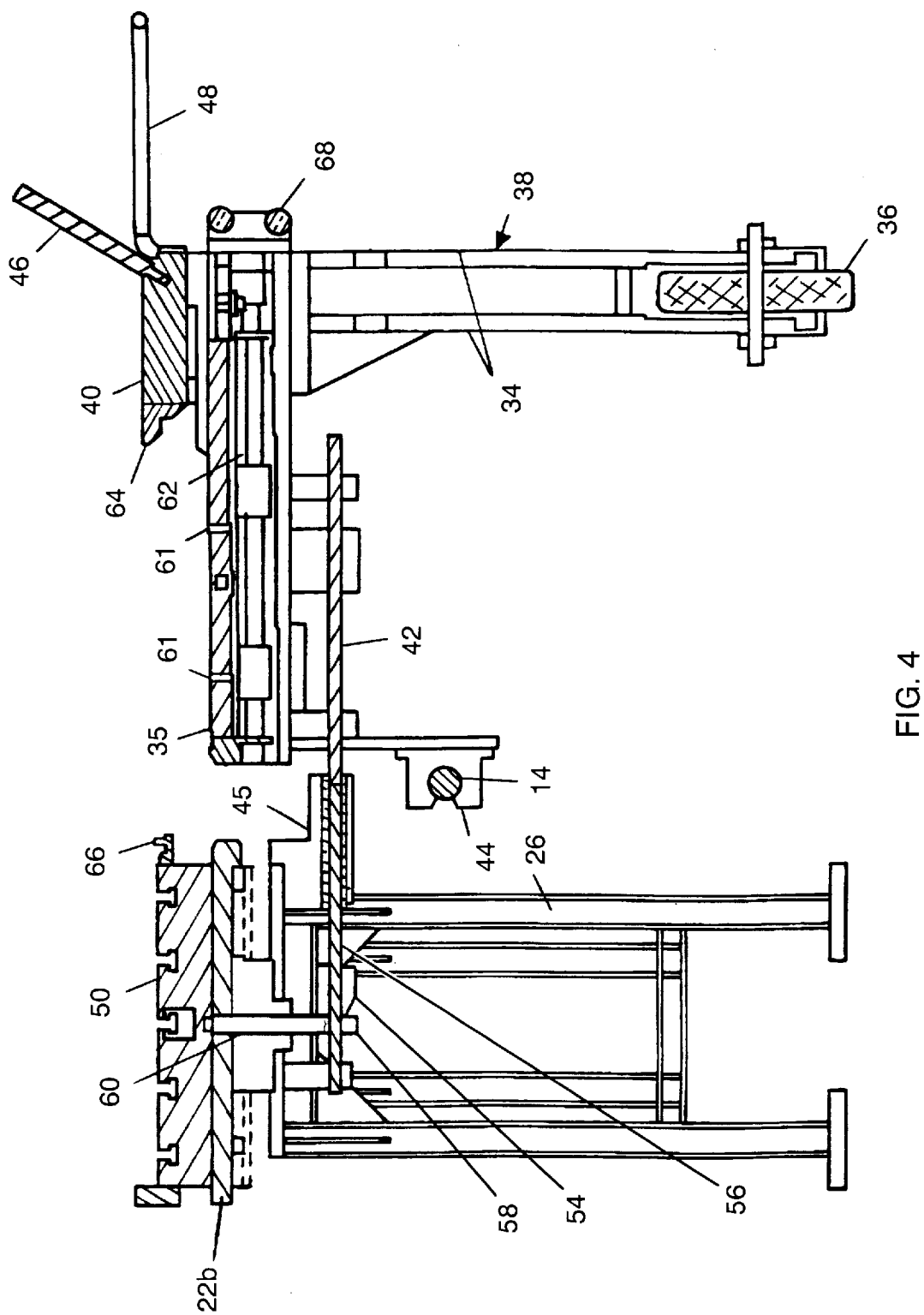
FIG. 4 is a cross section of the pallet shuttle cart connected to a locator spring block assembly of a receiving plate of a pallet storage rack.

Referring now to FIG. 4, a cross section of the pallet shuttle cart 38 is shown connected to the locator spring block assembly 45 of a receiving plate 22b of the pallet storage rack 20. The pallet shuttle cart 38 as previously described comprises the outside leg 34 with the wheel 36 attached for rolling along a floor. The opposite side of the shuttle cart 38 is supported by a bearing block 44 which rides on the linear guideway 14.

The shuttle cart 38 comprises an adapter plate 40 which attaches to the receiving plate 35. An adapter plate handle 48 is provided for an operator to easily move the receiving plate 35 especially when supporting the pallet 50. When the operator pushes, via the adapter plate handle 48, the adapter plate 40, the shuttle cart receiving plate 35 moves forward several inches to bridge the gap between the shuttle cart 38 and the receiving plate to which a pallet 50 will be moved. The end of the pallet 50 facing the receiving plate 35 comprises the hitch 66 and a hitch receiver 64 is attached to the adapter plate 40 for connecting to the hitch 66. This connection enables the operator to move a pallet 50 off and on the pallet shuttle cart 38 as previously described. The adapter plate 40 moves along two linear guides 62. Mounted under the adapter plate 40 near the outside edges are two 1¼ bearing blocks 61 (shown in FIG. 4) on each side, which glide on linear guides 62. The bearing blocks 61 may be embodied by Part No. SPB-20-OPN manufactured by Thomson Industries, Inc., of Port Washington, N.Y. A pallet lock/unlock handle 70 is provided for securing the adapter plate 40 and likewise the receiving plate 35 so that a pallet 50 cannot accidently move once it is on the shuttle cart 38. A roll-up safety cover 68 is provided above the support leg 34 and it extends over the pallet shuttle cart 38 protecting the operator from any pinch points while moving the adapter plate 40 forward and backward.

Still referring to FIG. 4, the locator spring block assembly 45 is attached below the top surface of the storage rack 20 and extends approximately 6 inches outward beyond the edge of the storage rack 20 top surface. The shuttle cart push rod 42 enters the locator spring block assembly 45 and engages the storage rack push rod 56. As the shuttle cart push rod 42 is moved by means of push rod handle 52 further into the locator spring block assembly 45, a tapered dog 54 is engaged by the storage rack push rod 56 causes a locking pin roller adapter 58 to release a spring loaded pallet locking pin 60 which secures the pallet 50 on the receiving plate 22b. The locking pin 60 is vertically positioned extending approximately from the center of the receiving plate down to the locking pin roller adapter 58.

Referring now to FIG. 2 and 4 the operation of a pallet 50 exchange system 10 is accomplished by manually moving the pallet shuttle cart 38 into position along the linear guideway 14 in front of the receiving plate 22b of the pallet storage rack 20. Once the shuttle cart is in position the shuttle cart push rod 42 is inserted into the locator block assembly 45 and then the pallet shuttle cart 38 is locked into position by means of the locking pin push rod handle 52. After the shuttle cart push rod 42 is moved into the forward position (about 3 inches into the locator spring block assembly 45), the tapered dog 54 on the storage rack push rod 56 causes the locking pin roller adapter 58 to release the pallet locking pin 66. This releases the pallet 50 from the storage rack 20 and allows the shuttle cart adapter plate 40 to be pushed forward along the linear guides 62 using the adapter plate handle 48. This allows the hitch receiver 64 to lock onto the pallet hitch 66 securing the pallet 50 to the adapter plate 40. At this time the roll-up safety cover 68 is extended over the pallet shuttle cart 38 protecting the operator from any pinch points while moving the adapter plate 40 forward or backward. Pulling back on the adapter plate handle 48 causes the pallet to move from the storage rack receiving plate 22b onto the shuttle cart receiving plate 35. Once the adapter plate handle 48 is pulled back enough, the pallet locking handle 70 secures the pallet on the shuttle cart 38. At this time the shuttle cart push rod 42 can be retracted from the storage rack locator spring block assembly 45 after unlocking the push rod 42 using the push rod handle 52. This releases the shuttle cart 38 enabling it to safely move the pallet 50 to the machining center 18, set-up station 16 or another position on the storage rack 20. The pallet set-up station 16 locking mechanism (not shown) is identical in design and operation to the storage rack locking mechanism shown in FIG. 4.

This concludes the description of the preferred embodiment. However, many modifications and alterations will be obvious to one of ordinary skill in the art within departing from the spirit and scope of the inventive concept. Therefore, the intent of the appended claims is to cover all such variations and modifications as come within the true spirit and scope of this invention. It is intended that the scope of this invention be limited only by the appended claims.

What is claimed as new and desired to be secured by letters patent of the united states is:

1. A manual pallet exchange apparatus for a horizontal machining center comprising:

a pallet storage rack including at least one pallet receiving means for supporting and transferring said pallet;

guideway means attached to support structures adjacent to said horizontal machining center and said pallet storage rack for providing a linear rail without inhibiting operator access to a front pallet receiving portion of said machining center;

cart means attached to said guideway means for manually moving a pallet between said horizontal machining center and said pallet storage rack along said guideway means, said cart means comprises a push rod for insertion into said pallet receiving means; and said receiving means of said pallet storage rack comprises a locking pin means for securing said pallet on said receiving means, said locking pin means extending from said receiving means into the bottom of said pallet when said shuttle cart push rod causes a storage rack push rod to extend said locking pin means.

2. The manual pallet exchange apparatus as recited in claim 1 wherein each of said horizontal machining center and said cart means comprises pallet receiving means for supporting and transferring said pallet.

3. The manual pallet exchange apparatus as recited in claim 2 wherein said locking pin means is deactivated by the insertion of said shuttle cart push rod into a locator spring block assembly of said receiving means.

4. The manual pallet exchange apparatus as recited in claim 2 wherein said cart means comprises a locking means for securing said pallet on said receiving means of said cart.

5. The manual pallet exchange apparatus as recited in claim 1, wherein said cart means comprises a leg having a wheel for supporting one side of said cart means opposite the side attached to said guideway means.

6. A manual pallet exchange apparatus for a horizontal machining center comprising;

a pallet storage rack including at least one pallet receiving means for supporting and transferring said pallet;

a pallet set-up station including said pallet receiving means for supporting and transferring said pallet;

guideway means attached to support structures adjacent to said horizontal machining center, said pallet storage rack and said pallet set-up station for providing a linear rail without inhibiting operator access to a front pallet receiving portion of said machining center;

cart means attached to said guideway means far manually moving a pallet among said machining center, said pallet storage rack and said pallet set-up station along said guideway means, said cart means comprises a push rod for insertion into said pallet receiving means; and said receiving means of said pallet storage rack and said set-up station comprises a locking pin means for securing said pallet on said receiving means, said locking pin means extending from said receiving means into the bottom of said pallet, when said shuttle cart push rod causes a storage rack push rod to extend to said locking pin means.

7. The manual pallet exchange apparatus as recited in claim 6 wherein each of said horizontal machining center and said cart means comprises pallet receiving means for supporting and transferring said pallet.

8. The manual pallet exchange apparatus as recited in claim 7 wherein said locking pin means is deactivated by the insertion of said shuttle cart push rod into a locator spring block assembly of said pallet storage rack.

9. The manual pallet exchange apparatus as recited in claim 7 wherein said cart means comprises a locking means for securing said pallet on said receiving means said art.

10. The manual pallet exchange apparatus as recited in claim 6, wherein said cart means comprises a leg having a wheel for supporting one side of said cart means opposite the side attached to said guideway means.

11. A method of manually exchanging pallets for a horizontal machining center comprising the steps of:

providing a pallet storage rack including at least one pallet receiving means for supporting and transferring said pallet;

positioning support structures adjacent to said pallet storage rack and said horizontal machining center;

attaching a linear rail to said support structures to form a linear guideway without inhibiting operator access to a front pallet receiving portion of said machining center;

providing a pallet shuttle cart attached to said linear guideway for manually moving pallets between said horizontal machining center and said pallet storage rack, said pallet shuttle cart comprises a push rod for insertion into said pallet receiving means; and securing said pallets on said pallet receiving means with a locking pin means extending from said receiving means into the bottom of said pallet, when said shuttle cart push rod causes a storage rack push rod to extend said locking pin means.

12. The method as recited in claim 11 further comprises the step of providing receiving means for supporting and transferring said pallets, said horizontal machining center and said pallet shuttle cart.

13. The method as recited in claim 12 further comprises the step of deactivating said locking pin means by inserting said shuttle cart push rod into a locator spring block assembly of said pallet storage rack.

14. The method as recited in claim 12 further comprises the step of providing a locking means in said pallet shuttle cart for securing said pallet on said receiving means of said cart.

* * * * *